United States Patent
Kurata et al.

(10) Patent No.: US 7,891,204 B2
(45) Date of Patent: Feb. 22, 2011

(54) REFRIGERATION CYCLE DEVICE FOR VEHICLE

(75) Inventors: Shun Kurata, Kariya (JP); Takeshi Wakisaka, Ichinomiya (JP); Katsuhiko Honda, Nara (JP)

(73) Assignee: Denso Corporation, Kariya (JP)

( * ) Notice: Subject to any disclaimer, the term of this patent is extended or adjusted under 35 U.S.C. 154(b) by 371 days.

(21) Appl. No.: 12/215,596

(22) Filed: Jun. 26, 2008

(65) Prior Publication Data

US 2009/0000319 A1 Jan. 1, 2009

(30) Foreign Application Priority Data

Jun. 29, 2007 (JP) ............................. 2007-171523

(51) Int. Cl.
- *B60H 1/32* (2006.01)
- *F25B 49/00* (2006.01)
- *G06F 7/00* (2006.01)

(52) U.S. Cl. ............................. 62/133; 62/228.3; 701/36
(58) Field of Classification Search ................... 62/133, 62/115, 176.3, 176.6, 228.3; 701/36; 417/222.2
See application file for complete search history.

(56) References Cited

U.S. PATENT DOCUMENTS 6,425,254 B1 7/2002 Ota et al.

FOREIGN PATENT DOCUMENTS

| EP | 1 489 369 | 12/2004 |
|---|---|---|
| EP | 1489369 A1 * | 12/2004 |
| EP | 1491375 A2 * | 12/2004 |
| JP | 2000-158939 | 6/2000 |
| JP | 2001-047856 | 2/2001 |
| JP | 2004-183623 | 7/2004 |
| JP | 2005-009734 | 1/2005 |

OTHER PUBLICATIONS

Office action dated Apr. 14, 2009 in Japanese Application No. 2007-171523.

* cited by examiner

*Primary Examiner*—Chen-Wen Jiang
(74) *Attorney, Agent, or Firm*—Harness, Dickey & Pierce, P.L.C.

(57) ABSTRACT

In a refrigeration cycle device with a capacity-variable compressor, a preset suction pressure that serves as a target value of a refrigerant suction pressure of the compressor is calculated and a refrigerant discharge capacity of the compressor is controlled by operating a capacity varying portion such that the suction pressure of the compressor is appreciated to the preset suction pressure. A thermal load detection portion is configured to detect a thermal load of a refrigeration cycle, and a refrigerant flow amount detection portion is configured to detect a flow amount of refrigerant circulating through the refrigeration cycle. In the refrigeration cycle device, a pressure at a predetermined part of the compressor is estimated based on the thermal load detected by the thermal load detection portion and on the flow amount detected by the refrigerant flow amount detection portion.

10 Claims, 4 Drawing Sheets

REFRIGERATION CYCLE DEVICE FOR VEHICLE

CROSS REFERENCE TO RELATED APPLICATION

This application is based on Japanese Patent Application No. 2007-171523 filed on Jun. 29, 2007, the contents of which are incorporated herein by reference in its entirety.

FIELD OF THE INVENTION

The present invention relates to a refrigeration cycle device for a vehicle.

BACKGROUND OF THE INVENTION

A capacity-variable compressor (variable displacement compressor) used in a refrigeration cycle device for a vehicle is driven by an engine of the vehicle as a source of drive, and is provided with a capacity-varying unit for varying the refrigerant discharge capacity. In the refrigeration cycle device used in an air condition control unit, the refrigerant discharge capacity of the capacity-variable compressor is controlled by operating the capacity-varying unit so that the suction pressure of the capacity-variable compressor becomes equal to a preset suction pressure.

In the known refrigeration cycle device for a vehicle equipped with the capacity-variable compressor of the suction pressure control type, an emergency control is performed such as acceleration cut control of the capacity-variable compressor in a transient state where the vehicle speed sharply changes and the rotational speed of the compressor sharply changes, in order to decrease the load exerted on the engine of the vehicle (e.g., JP-A-2001-47856).

In the above discharge capacity control, however, at the time of shifting into the normal control after the end of the acceleration cut control (emergency control), a control signal output to the capacity-varying unit is determined by selecting an optimum control map out of a plurality of control maps defining correlations between the control signals and a shift elapse time from the emergency control to the normal control. The control map is selected based on the compressor suction pressure at the end of the emergency control. Here, a suction pressure sensor for detecting the suction pressure is used to correctly detect the suction pressure of the compressor resulting, however, in an increase in the cost due to the constitution and arrangement in the compressor and due to an increase in the number of parts.

Therefore, when the refrigerant discharge capacity of the capacity-variable compressor is controlled, in general, the pressure in an evaporator is calculated from the temperature of the evaporator detected by an evaporator temperature sensor, and the pressure in the evaporator is estimated as the compressor suction pressure. In this case, a problem arouses in that the suction pressure of the compressor that is estimated from the evaporator pressure deviates from the real suction pressure of the compressor.

SUMMARY OF THE INVENTION

In view of the foregoing problems, it is a first object of the present invention to accurately estimate a pressure at a predetermined part in a capacity-variable compressor with a simple constitution. Further, a second object of the invention is to suitably calculate a preset suction pressure of a compressor when an engine of a vehicle is operated in a high load.

According to an aspect of the present invention, a refrigeration cycle device for a vehicle includes a refrigeration cycle that includes a capacity-variable compressor driven by an engine mounted on the vehicle and having a capacity varying portion configured to vary a refrigerant discharge capacity discharged from the compressor, and an evaporator coupled to a refrigerant suction side of the compressor and for cooling air to be blown into a compartment by evaporating a low-pressure refrigerant. Furthermore, the refrigeration cycle device includes discharge capacity control means for calculating a preset suction pressure that serves as a target value of a refrigerant suction pressure of the compressor and for controlling the refrigerant discharge capacity of the compressor by operating the capacity varying portion such that the suction pressure is appreciated to the preset suction pressure, a thermal load detection portion configured to detect a thermal load of the refrigeration cycle, a refrigerant flow amount detection portion configured to detect a flow amount of refrigerant circulating through the refrigeration cycle, and pressure estimation means for estimating a pressure at a predetermined part of the compressor based on the thermal load detected by the thermal load detection portion and on the flow amount detected by the refrigerant flow amount detection portion.

Because the pressure at the predetermined part of the capacity-variable compressor is estimated based on the thermal load and the refrigerant flow amount in the refrigeration cycle, fluctuation in the pressure due to an increase or decrease of the refrigerant flow amount in the refrigeration cycle can be more effectively reflected on estimating the pressure at the predetermined part, as compared with a case where the pressure at the predetermined part of the capacity-variable compressor is estimated based on only the thermal load in the refrigeration cycle.

Further, the pressure at the predetermined part of the capacity-variable compressor can be estimated based on the constitution of the thermal load detection portion and the refrigerant flow amount detection portion in the refrigeration cycle, thereby making it possible to suppress an increase in the number of parts. As a result, the pressure at the predetermined part of the capacity-variable compressor can be correctly estimated with a simple constitution in the refrigeration cycle device.

For example, the pressure at the predetermined part is the refrigerant suction pressure of the compressor. In this case, fluctuation in the pressure between the evaporator and the compressor in the refrigeration cycle, caused by an increase or decrease of the refrigerant flow amount in the refrigeration cycle, can be reflected on estimating the suction pressure of the compressor. Accordingly, the suction pressure in the refrigeration cycle can be correctly estimated with a simple constitution without the need of providing a suction pressure sensor for detecting the suction pressure.

For example, the thermal load detection portion may be an evaporator temperature detector configured to detect an evaporator temperature which is a physical quantity related to a refrigerant temperature in the evaporator. In this case, the pressure estimation means estimates an evaporator pressure which is a refrigerant pressure in the evaporator based on the evaporator temperature detected by the evaporator temperature detector, estimates a pressure loss of the refrigerant between the evaporator and the compressor based on the flow amount detected by the refrigerant flow amount detection portion, and estimates the refrigerant suction pressure of the compressor by subtracting the pressure loss from the evaporator pressure.

The refrigeration cycle apparatus may be further provided with engine load detecting means for detecting a load condition exerted on the engine, and load condition determining means for determining whether the engine is at a high load condition based on the load condition detected by the engine load detection. In this case, the pressure estimation means estimates an estimated suction pressure after the load condition determining means determines that the engine is at the high load condition, and the discharge capacity control means calculates the preset suction pressure based on the estimated suction pressure and controls the refrigerant discharge capacity of the compressor such that the suction pressure of the compressor becomes the preset suction pressure.

For example, the load condition may include a vehicle speed and an accelerator open degree of the vehicle. In this case, the load condition determining means determines that the engine is at the high load condition when the vehicle speed is lower than a predetermined speed and when the accelerator open degree is larger than a predetermined open degree.

Alternatively, the preset suction pressure may be calculated by adding a predetermined pressure to the estimated suction pressure. Furthermore, the predetermined pressure may be increased or decreased in proportion to the refrigerant flow amount detected by the refrigerant flow amount detection portion.

The refrigerant discharge capacity control means may control the capacity varying portion as to give the preset suction pressure that is calculated based on the estimated suction pressure and, thereafter, may gradually decrease the preset suction pressure. Alternatively, the refrigerant discharge capacity control means may perform a feedback control such that the suction pressure of the compressor becomes the preset suction pressure calculated based on the estimated suction pressure. Furthermore, the preset suction pressure may be the evaporator pressure estimated based on the evaporator temperature, or/and the refrigerant flow amount detection portion may be configured to detect the flow amount of refrigerant discharged from the compressor.

BRIEF DESCRIPTION OF THE DRAWINGS

Additional objects and advantages of the present invention will be more readily apparent from the following detailed description of preferred embodiments when taken together with the accompanying drawings. In which:

FIG. 6 is a diagram of characteristics illustrating a relationship between a preset suction pressure Pso and a control current In.

DETAILED DESCRIPTION OF THE INVENTION

Figure 1:
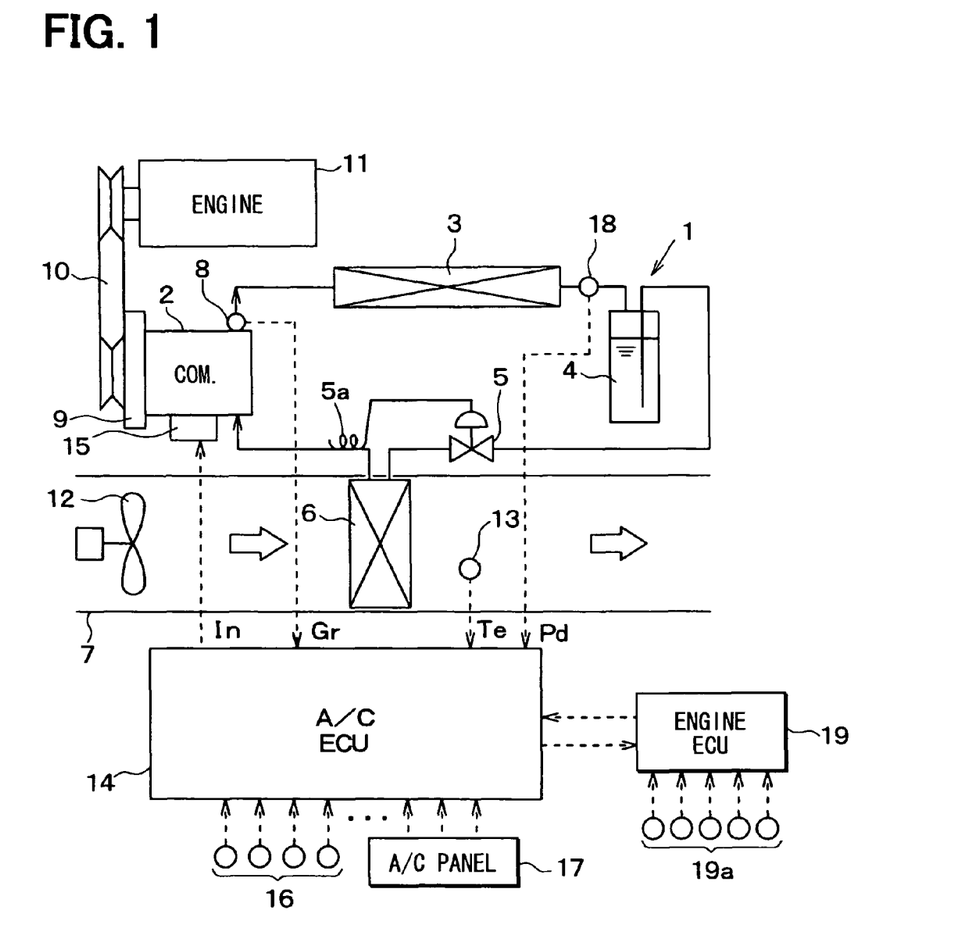
FIG. 1 is a schematic diagram illustrating the whole constitution of a refrigeration cycle device for vehicle air conditioning according to an embodiment of the invention.

An embodiment of the present invention will be now described with reference to the accompanying drawings. In this embodiment, a refrigeration cycle device 1 is typically used for a vehicle air conditioner. FIG. 1 is a schematic diagram illustrating the whole constitution of the refrigeration cycle device 1 for vehicle air conditioning.

Referring to FIG. 1, the refrigeration cycle device 1 for vehicle air conditioning is equipped with a capacity-variable compressor 2. The capacity-variable compressor 2 is driven and rotated upon receiving a driving force from an engine 11 for traveling the vehicle through a power transmission mechanism 9, a belt 10 and the like.

This embodiment uses, as the capacity-variable compressor 2, an external capacity-variable compressor capable of continuously varying the refrigerant discharge capacity in response to a control signal (control current In) from an air condition control unit 14 (A/C ECU). The external capacity-variable compressor is a known one and includes a capacity-varying unit 15 having an electromagnetic pressure control unit (not shown) for controlling the pressure in a swash plate chamber by using a refrigerant discharge pressure Pd and a refrigerant suction pressure Ps, for example, in a swash plate compressor.

Upon controlling the pressure in the swash plate chamber by using the capacity-varying unit 15, the tilting angle of the swash plate is varied to continuously vary the stroke of a piston, i.e., to continuously vary the compressor discharge capacity in a range of about 0 to 100%.

The electromagnetic pressure control unit of the capacity-varying unit 15 varies the control pressure Pc (pressure in the swash plate chamber) by using the refrigerant discharge pressure Pd and the refrigerant suction pressure Ps of the capacity-variable compressor 2.

The electromagnetic pressure control unit has an electromagnetic mechanism of which the electromagnetic force is adjusted by a control current In and a valve body which undergoes the displacement depending upon a balance between the electromagnetic force of the electromagnetic mechanism and the refrigerant suction pressure Ps. The valve body adjusts the pressure loss in the passage which guides the refrigerant discharge pressure Pd of the capacity-variable compressor 2 into the swash plate chamber, and varies the control pressure.

The electric current flowing into the electromagnetic pressure control unit of the capacity-varying unit 15 is controlled by the air condition control unit 14, and the refrigerant discharge capacity of the compressor 2 increases with an increase in the control current In of the capacity-varying unit 15.

Figure 6:
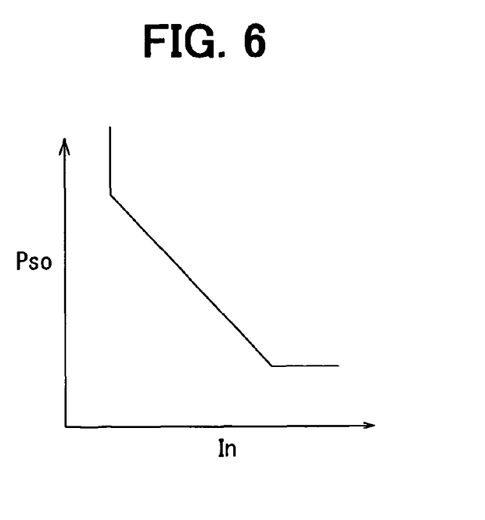

Here, as the refrigerant discharge capacity of the compressor 2 increases, the refrigerant suction pressure (pressure on the low pressure side after being decompressed) Ps decreases. That is, the control current In of the capacity-varying unit 15 determines a preset suction pressure Pso which is a target value of the real suction pressure Ps, and the preset suction pressure Pso decreases in reverse proportion to an increase in the control current In (see FIG. 6).

By increasing or decreasing the control current In, therefore, the refrigerant discharge capacity of the capacity-variable compressor 2 or the refrigerant flow amount that is discharged is increased or decreased to increase or decrease the real suction pressure Ps, and the cooling capability of an evaporator 6 that will be described later is controlled so that the temperature of the evaporator 6 (evaporator temperature Te) reaches a predetermined final target temperature TEO (temperature corresponding to the preset suction pressure Pso).

That is, the control current In varies depending on the duty control. Here, however, the value of the control current In may be directly and continuously increased or decreased (in an analog manner) without relying upon the duty control.

The swash-plate type capacity-variable compressor 2 is capable of continuously varying the refrigerant discharge capacity from 100% to nearly about 0% upon adjusting the control pressure Pc. Upon decreasing the refrigerant discharge capacity down to nearly about 0%, the capacity-variable compressor 2 is substantially brought into a condition of stopping the operation. Therefore, a clutch-less constitution can be used in which the rotary shaft of the capacity-variable compressor 2 is maintained to be coupled to a pulley on the side of the vehicle engine at all times via pulleys, belt and the like.

Further, the capacity-variable compressor 2 is provided with a flow amount sensor 8 therein on the discharge side to detect a flow amount Gr of the gas phase refrigerant discharged from the capacity-variable compressor 2. The flow amount sensor 8 corresponds to flow amount control portion of the present invention.

The flow amount sensor 8 in this embodiment is provided with a throttle portion (not shown) and a differential pressure detector (not shown). The throttle portion is provided for squeezing the flow amount of the refrigerant discharged from the capacity-variable compressor 2, and a pressure loss (differential pressure) between the two points preceding and succeeding the throttle portion is detected by the differential pressure detector.

By using the air condition control unit 14 that will be described later, the flow amount sensor 8 estimates the flow amount of the refrigerant based on the pressure loss between the two points detected by the differential pressure detector and on the density of the refrigerant that is blown out to thereby indirectly detect the flow amount of the refrigerant in the refrigeration cycle device 1.

Here, the density of the refrigerant that is discharged has a relationship of 1 to 1 with respect to the discharge pressure (i.e., high pressure before being decompressed). Therefore, a control map (not shown) specifying a correlation between the pressure loss detected by the flow amount sensor 8 and the discharge pressure detected by a high pressure sensor 18 that will be described later, is stored in advance in a ROM or the like of the air condition control unit, and the density of the refrigerant that is to be discharged is estimated based on the control map.

The refrigerant discharge side of the capacity-variable compressor 2 is connected to an inlet side of a condenser 3. The condenser 3 is a heat radiator which is arranged between the engine 11 and the front grill (not shown) of the vehicle in the engine room, and cools the refrigerant by exchanging the heat between the refrigerant discharged from the capacity-variable compressor 2 and the external air blown by a blower fan (not shown).

The refrigerant outlet side of the condenser 3 is connected to a refrigerant inlet side of a gas-liquid separator 4. The gas-liquid separator 4 is for separating the refrigerant cooled through the condenser 3 into the gas phase refrigerant and the liquid phase refrigerant.

The refrigerant outlet side of the gas-liquid separator 4 is connected to an expansion valve 5. The expansion valve 5 works to expand, under a reduced pressure, the liquid phase refrigerant separated by the gas-liquid separator 4, and adjusts the flow amount of the refrigerant flowing out from the outlet side of the expansion valve 5.

Concretely, the expansion valve 5 has a temperature sensitive cylinder 5a for detecting the refrigerant temperature between the capacity-variable compressor 2 and the evaporator 6 that will be described later, detects the superheated degree of the refrigerant on the suction side of the capacity-variable compressor 2 based on the temperature and pressure of the refrigerant taken in by the capacity-variable compressor 2, and adjusts the valve-opening degree so that the superheated degree becomes a preset value.

The downstream side of the expansion valve 5 is connected to the evaporator 6. The evaporator 6 is a heat exchanger arranged in an air conditioner casing 7 of the air conditioner unit, and exchanges the heat between the low-pressure refrigerant expanded by the expansion valve 5 and air blown by a blower fan 12 arranged in the air conditioner casing 7.

Here, air (internal air) inside the compartment of the vehicle introduced from a known internal/external air switching box (not shown) provided in the air conditioner casing 7 or/and air (external air) outside the compartment of the vehicle, is blown through the air conditioner casing 7 into the compartment of the vehicle by the blower 12. The blown air passes through the evaporator 6 and through a heater unit (not shown) to have a conditioned temperature, and is blown into the compartment of the vehicle through at least one blow-out port.

An evaporator temperature sensor 13 which is a thermistor is provided at a position where the air is just blown out from the evaporator 6 in the air conditioner casing 7 to detect the blown-out air temperature just after having passed through the evaporator 6 (evaporator temperature Te). Here, the evaporator temperature sensor 13 corresponds to evaporator temperature detection portion in the invention.

At air downstream end of the air conditioner casing 7 are formed a face blow-out port for blowing out the air to the upper half body of a passenger (not shown) in the compartment, a feet blow-out port for blowing out the air to the feet of the passenger in the compartment and a defroster blow-out port for blowing out the air to the inner surface of the windshield. An air blow-out mode door (not shown) is located in the air conditioner casing 7 to switch, open and close the blow-out ports.

The refrigerant downstream side of the evaporator 6 is connected to the capacity-variable compressor 2, and the refrigerant after being evaporated flows into the capacity-variable compressor 2 again. In the refrigeration cycle device 1 as described above, the refrigerant circulates in order of the capacity-variable compressor 2→the condenser 3→the gas-liquid separator 4→the expansion valve 5→the evaporator 6→the compressor 2.

Next, the air condition control unit 14 (A/C ECU) of this embodiment will be briefly described. The air condition control unit 14 is constituted by a known microcomputer inclusive of CPU, ROM, RAM and the like, and peripheral circuits. The air condition control unit 14 stores an air conditioner control program in the ROM thereof, and performs various operations and processings based on the air conditioner control program.

To the air condition control unit 14 are input detection signals from the flow amount sensor 8 and the evaporator temperature sensor 13, as well as detection signals from a group of sensors 16 for automatically controlling the air conditioning and operation signals from a group of operation switches of an air conditioner operation panel 17.

Concretely, the group of sensors 16 for air conditioning includes an external air sensor for detecting the external air temperature Tam, an internal air sensor for detecting the internal air temperature Tr, a solar radiation sensor for detecting the amount Ts of solar radiation entering the compartment, etc.

Further, the refrigeration cycle device 1 is provided with a high pressure sensor 18 in a high-pressure circuit portion thereof on the way from the discharge side of the capacity-variable compressor 2 to the inlet of the expansion valve 5 to detect a high pressure (e.g., pressure Pd of the refrigerant discharged from the compressor 2). A detection signal of the high pressure sensor 18 is also input to the air condition control unit 14. In the embodiment shown, the high pressure sensor 18 is provided in the refrigerant pipe on the outlet side of the condenser 3.

The air conditioner operation switches provided on the air conditioner operation panel 17 include an air conditioner switch for sending an operation instruction signal to the capacity-variable compressor 2, an air blow-out mode switch for setting an air blow-out mode, an automatic switch for sending a signal for instructing an automatic control state, a temperature setting switch which is a temperature setting means for setting the temperature in the compartment, and the like.

The output side of the microcomputer of the air condition control unit 14 is connected to an electromagnetic clutch 9 and to the blower fan 12 of the evaporator 6 and the like through a drive circuit (not shown) for driving various actuators, and is, further, connected to the capacity-varying unit 15 of the capacity-variable compressor 10. Operations of these various actuators 9, 12 and 15 are controlled by the output signals of the air condition control unit 14.

The air condition control unit 14 is connected to an engine control unit 19 (engine ECU) on the vehicle side, and signals communicate between these two control units 14 and 19.

As is well known, the engine control unit 19 totally controls the amount of injecting the fuel into the vehicle engine 11, the ignition timing and the like based on signals from the group of sensors 19a that detect the operation conditions and the like of the vehicle engine 11.

The group of engine sensors 19a include a vehicle speed sensor for detecting the speed of the vehicle, an accelerator open degree sensor for detecting the amount the accelerator pedal is depressed by the driver (accelerator open degree), and the like sensors. The engine control unit 19 outputs the vehicle speed detected by the vehicle speed sensor and the accelerator open degree detected by the accelerator open degree sensor and the like to the air condition control unit 14.

Figure 2:
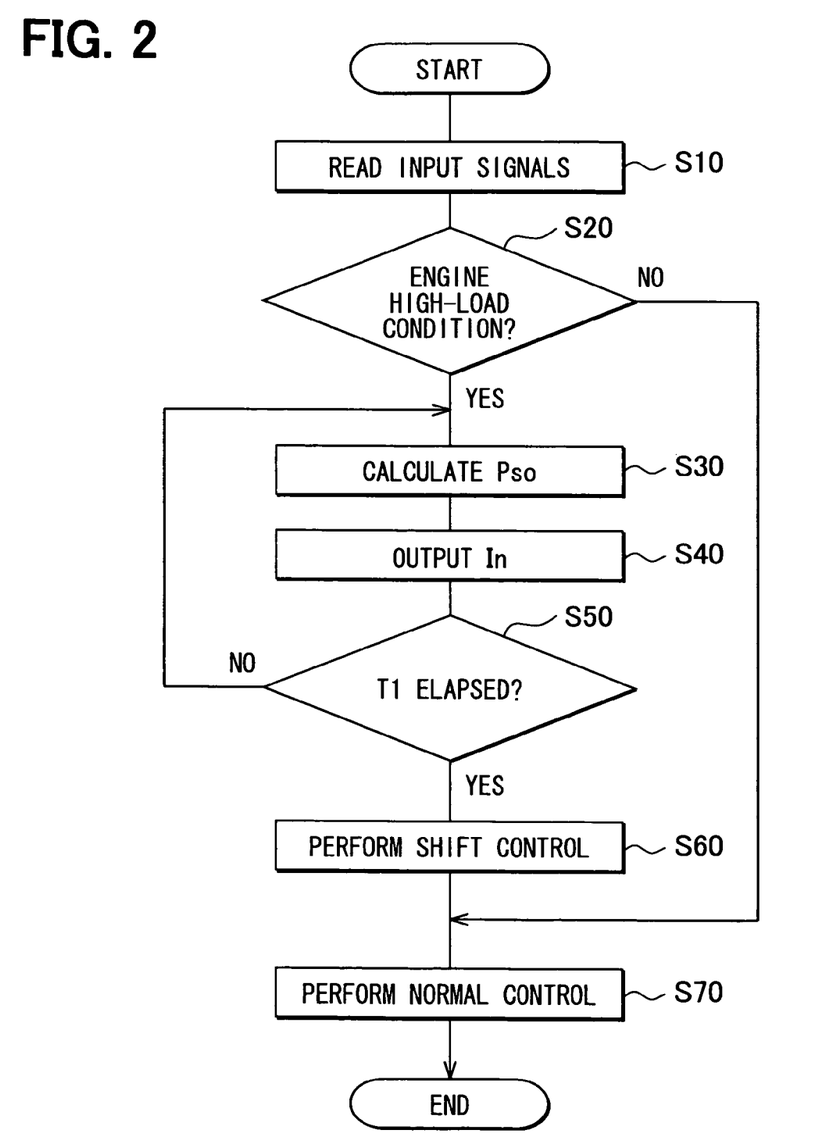
FIG. 2 is a flowchart illustrating a control processing of the refrigeration cycle device according to the embodiment of the invention.

A control processing for controlling the capacity of the capacity-variable compressor 2 performed by the air condition control unit 14 of the embodiment will be described next with reference to FIG. 2. FIG. 2 is a flowchart illustrating the control processing of the refrigeration cycle device 1 of this embodiment.

In a state where an ignition switch of the vehicle engine 11 is turned on and the electric power is supplied from a battery B (not shown) to the air condition control unit 14 and to the engine control unit 19, the control routine shown in FIG. 2 starts working in response to an operation signal from the air conditioner operation switch.

At step S10, first, operation signals of the air conditioner operation panel 17, detection signals of the flow amount sensor 8 and the evaporator temperature sensor 13, and detection signals of the group of air sensors 16 for conditioning the air and the group of engine sensors 19a, are read.

At step 20, next, it is determined whether the vehicle engine is operated at a high-load condition. For example, it is determined that the vehicle engine is at the high-load condition if the vehicle speed read at step S10 is lower than a predetermined speed and an accelerator open degree is larger than a predetermined accelerator open degree. Here, step S20 corresponds to engine load detection means of the invention.

If it is determined at step S20 that the vehicle engine is under the high-load condition, an acceleration cut control (step S30 to step S50) is performed to decrease the compressor torque and to give priority to the vehicle acceleration.

At step S30, first, the vehicle engine is operated at the high-load condition, and a preset suction pressure Pso of the capacity-variable compressor 2 is calculated to perform the acceleration cut control.

The preset suction pressure Pso according to this embodiment is calculated by adding a predetermined pressure α to an estimated suction pressure Ps1 of the capacity-variable compressor 2 at the start of the acceleration cut control as expressed by the following formula F1.

$$Pso = Ps1 + \alpha \tag{F1}$$

Figure 3:
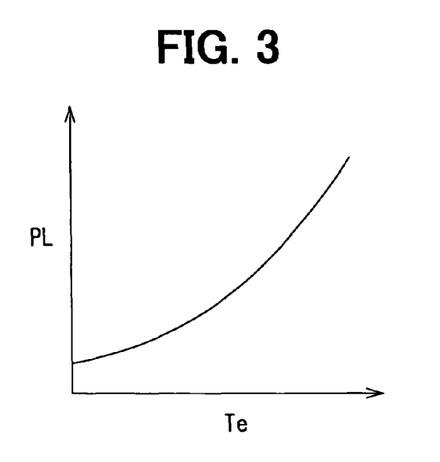
FIG. 3 is a saturation pressure diagram showing a relationship between an evaporator pressure PL and an evaporator temperature Te.
Figure 4:
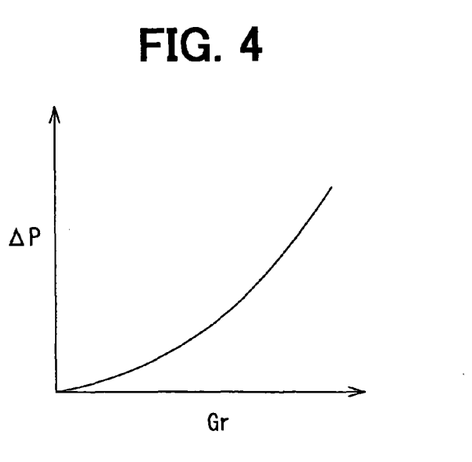
FIG. 4 is a diagram illustrating a relationship that holds on a theoretical formula of a pressure loss $\Delta P$ and a refrigerant flow amount Gr, between an evaporator and a capacity-variable compressor of the refrigeration cycle device.

First, a method of estimating the estimated suction pressure Ps1 at the start of the acceleration cut control will be described with reference to FIGS. 3 and 4. FIG. 3 is a saturation pressure diagram illustrating a correlation between the evaporator temperature Te and the evaporator pressure PL, and FIG. 4 is a diagram illustrating a correlation between the refrigerant flow amount Gr and the pressure loss ΔP between the evaporator and the compressor. Here, the evaporator pressure PL stands for a refrigerant pressure in the evaporator 6.

The estimated suction pressure Ps1 can be correctly estimated with constitution that a suction pressure sensor is provided, but the problem that the constitution of the capacity-variable compressor 2 becomes complex is caused.

According to this embodiment, therefore, the estimated suction pressure Ps1 is estimated by a simple constitution using the refrigerant flow amount Gr detected by the flow amount sensor 8 and the evaporator temperature Te detected by the evaporator temperature sensor 13. Estimating the estimated suction pressure Ps1 at step S30 corresponds to pressure estimation means of the invention.

For example, the estimated suction pressure Ps1 at the start of the acceleration cut control is estimated by using the evaporator temperature Te and the refrigerant flow amount Gr as expressed by the following formula F2.

$$Ps1 = f(Te) - g(Gr) \tag{F2}$$

Here, at f(Te), the evaporator pressure PL is estimated from the evaporator temperature Te. For example, the evaporator pressure PL is estimated from the saturation pressure diagram shown in FIG. 3 based on the evaporator temperature Te detected by the evaporator temperature sensor 13. Further, g(Gr) estimates the pressure loss ΔP between the evaporator and the compressor from the refrigerant flow amount Gr on the discharge side of the capacity-variable compressor 2, detected by the flow amount sensor 8. The pressure loss ΔP across the evaporator and the compressor is estimated from the theoretical formula F3 based on the refrigerant flow amount Gr detected by the flow amount sensor 8.

$$g(Gr) = \zeta \rho Gr^2 \tag{F3}$$

wherein ζ is a coefficient of pipe loss and ρ is a density of the refrigerant.

The coefficient ζ of pipe loss and the density ρ of the refrigerant can be calculated by experiment and the like. FIG. 4 shows a correlation between the refrigerant flow amount Gr estimated by the theoretical formula F3 and the pressure loss ΔP across the evaporator and the compressor.

It is thus made possible to estimate the estimated suction pressure Ps1 at the start of the acceleration cut control by using a simple constitution without providing the capacity-variable compressor 2 with the suction pressure sensor.

As compared to the case of estimating the evaporator pressure PL as the estimated suction pressure Ps1, the estimated suction pressure Ps1 of the present embodiment can be more correctly estimated at the start of the acceleration cut control since the pressure loss ΔP across the evaporator and the compressor is taken into account.

Figure 5:
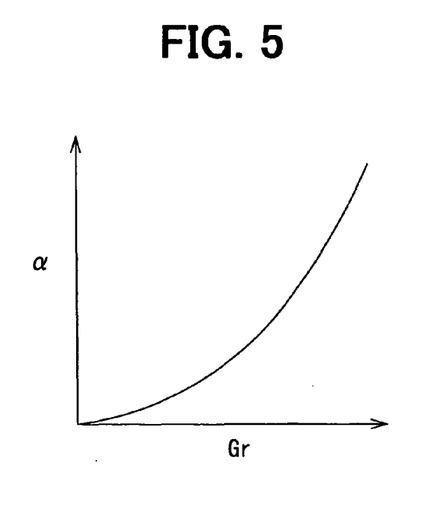
FIG. 5 is a diagram of characteristics defining a correlation between the refrigerant flow amount Gr and a predetermined pressure $\alpha$.

Next, described below with reference to FIG. 5 is a predetermined pressure α added to the estimated suction pressure Ps1 at the time of calculating the preset suction pressure Pso according to the formula F1. The predetermined pressure α is determined based on the refrigerant flow amount Gr of the refrigeration cycle device 1.

Concretely, the predetermined pressure α is estimated by using a control map having a correlation between the refrigerant flow amount Gr and the predetermined pressure α shown in FIG. 5. Here, the control map has such a relationship that the predetermined pressure α increases when the refrigerant flow amount Gr becomes larger and decreases when the refrigerant flow amount Gr becomes smaller. The control map is obtained through experiment and the like and is stored in advance in the ROM or the like in the air condition control unit 14.

In a state where the refrigerant flow amount Gr is large, the compressor torque is in the high-load state where the engine load is great. In a state where the refrigerant flow amount Gr is small, the compressor torque is in the low-load state where the engine load is small.

In the state where the refrigerant flow amount Gr is large, therefore, the predetermined pressure α is increased to forcibly and greatly increase the preset suction pressure Pso of the capacity-variable compressor 2 to thereby decrease the compressor torque and, therefore, to decrease the engine load.

In the state where the refrigerant flow amount Gr is small, on the other hand, the predetermined pressure α is decreased to forcibly and slightly increase the preset suction pressure Pso of the capacity-variable compressor 2 to thereby decrease the compressor torque and to decrease the engine load suppressing the passenger from feeling uncomfortable that may stem from varying air conditioning.

It is thus made possible to calculate a suitable preset suction pressure Pso of the capacity-variable compressor 2 when the engine 11 is under the high-load condition based on the estimated suction pressure Ps1 of the capacity-variable compressor 2 and on the predetermined pressure α that varies depending upon the refrigerant flow amount Gr.

Next, at step S40, a control current In is output to the capacity-varying unit 15 so that the real suction pressure Ps becomes equal to the preset suction pressure Pso calculated at step S30. The control current In is calculated from a control map having a correlation between the control current In and the preset suction pressure Pso shown in FIG. 6. Calculating the preset suction pressure Pso and outputting the control current In to the capacity-varying unit 15 at steps S30 and S40 correspond to discharge capacity control means of the invention.

Next, at step S50, the processings of steps S30 and S40 are continued until the acceleration priority time T1 elapses. Here, in normally accelerating the vehicle, the passenger feels a maximum acceleration of the vehicle for a period of time which is as short as not longer than a second immediately after the start of acceleration. Therefore, the acceleration priority time T1 is set correspondingly, i.e., set to be not longer than a second. Thus, the acceleration of the vehicle can be quickly raised.

After the acceleration priority time T1 has elapsed at step S50, the routine proceeds to step S60. At step S60, a shift control is performed to gradually decrease the preset suction pressure Pso over a shift control time T2, so that the suction pressure Ps at the end of the acceleration cut control will shift to the estimated suction pressure Ps1 at the start of the acceleration cut control.

This makes it possible to suppress a sharp decrease of acceleration caused by an increased load exerted on the vehicle engine 11 at a moment when the preset suction pressure Pso is sharply decreased from the end of the acceleration cut control and to suppress the shock due to a large load exerted on the capacity-variable compressor 2.

After the end of the shift control at step S60, the routine proceeds to step S70 to normally control the capacity-variable compressor 2. Similarly, even when it is determined at step S20 above that the vehicle is not at the high-load condition, the routine proceeds to step S70 to normally control the capacity-variable compressor 2.

In the normal control performed at step S70, a target blow-out temperature TAO of air flowing out of the evaporator 6 is calculated, and a control current In fed to the capacity-varying unit 15 of the capacity-variable compressor 2 is determined based on the target blow-out temperature TAO of air flowing out of the evaporator 6.

The target blow-out temperature TAO is calculated according to the following formula F4 based on a fluctuation in the air conditioner thermal load, temperature in the compartment (internal temperature) Tr and preset temperature Tset set by using a temperature setting switch which is one of the air conditioner operation switches.

$$TAO = Kset \times Tset - Kr \times Tr - Kam \times Tam - Ks \times Ts + C \quad (F4)$$

wherein Tr is an internal temperature detected by the internal temperature sensor, Tam is an external temperature detected by the external temperature sensor, Ts is an amount of sunshine detected by the sunshine sensor, Kset, Kr, Kam and Ks are control gains, and C is a constant for correction.

The suction pressure Ps that varies depending on the control processing of the embodiment will now be described with reference to FIGS. 7A to 7C.

Figure 7A:
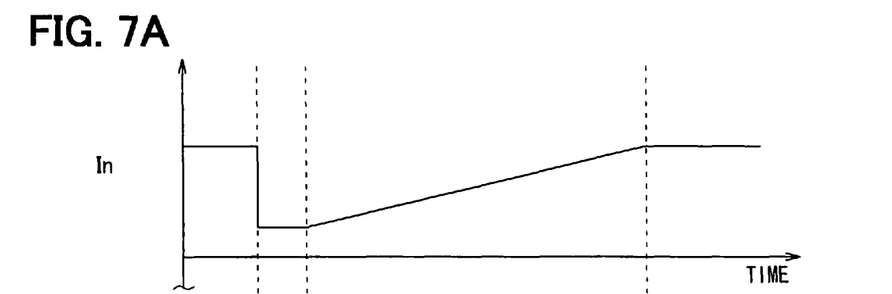
FIGS. 7A to 7C are time charts illustrating operation characteristics of the refrigeration cycle device.
Figure 7B:
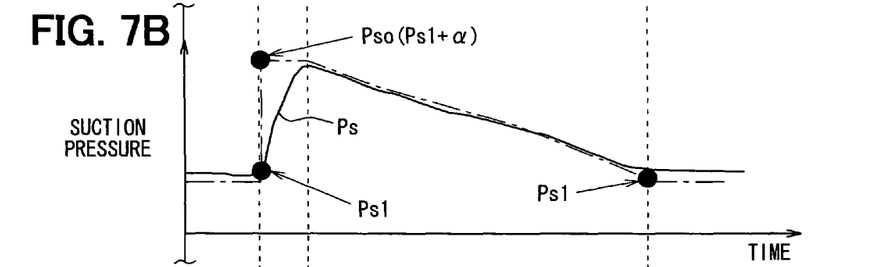
Figure 7C:
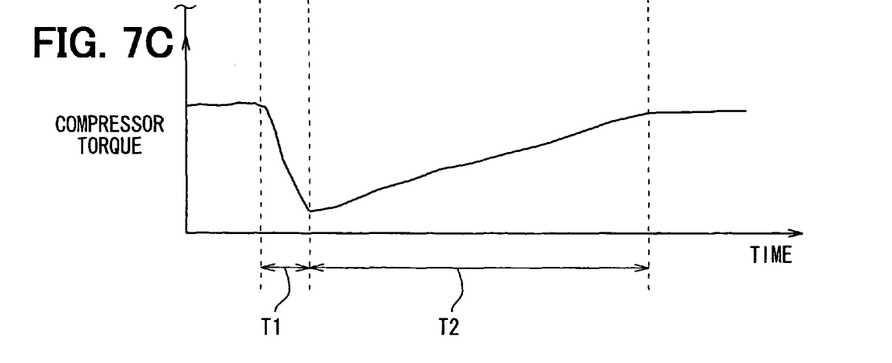

FIG. 7A is a timing chart of the control current In depending on the elapse of time of the control processing of the embodiment, FIG. 7B is a timing chart of the suction pressure Ps and the preset suction pressure Pso depending on the elapse of time of the control processing of the embodiment, and FIG. 7C is a timing chart of the compressor torque depending on the elapse of time of the control processing of the embodiment.

Referring to FIGS. 7A to 7C, as the acceleration cut control starts, the preset suction pressure Pso (a dot-dash chain line in FIG. 7B) is calculated by adding the predetermined pressure α to the estimated suction pressure Ps1 at the start of the acceleration cut control until the acceleration priority time T1 has elapsed, and a control current In is output that corresponds to the thus calculated preset suction pressure Pso (see FIG. 7B).

Accordingly, the real suction pressure Ps (solid line in FIG. 7B) increases to become equal to the preset suction pressure Pso. Therefore, the refrigerant discharge capacity of the capacity-variable compressor 2 decreases and the compressor torque load decreases as shown in FIG. 7C.

As the acceleration priority time T1 elapses, a control current In is output so as to linearly decrease the preset suction pressure Pso down to the estimated suction pressure Ps1 at the start of the acceleration cut control over a shift control time T2 for shifting into the normal control.

Since the real suction pressure Ps also approximately linearly decreases to become equal to the preset suction pressure Pso, the refrigerant discharge capacity of the capacity-variable compressor 2 gradually increases and the compressor torque load gradually increases.

In this embodiment as described above, the suction pressure Ps of the capacity-variable compressor 2 can be correctly estimated by using a simple constitution relying on the evaporator temperature Te detected by the evaporator temperature sensor 13 and the refrigerant flow amount Gr detected by the flow amount sensor 8.

Further, the preset suction pressure Pso at the time of executing the acceleration cut control can be calculated by adding up together the estimated suction pressure Ps1 at the start of the acceleration cut control and the predetermined pressure α correlated to the refrigerant flow amount Gr, making it possible to decrease the compressor torque and to prevent feeling in the compartment from being impaired. That is, a suitable preset suction pressure Pso can be calculated based on the estimated suction pressure Ps1 that is correctly estimated.

Other Embodiments

Although the present invention has been fully described in connection with the preferred embodiments thereof with reference to the accompanying drawings, it is to be noted that various changes and modifications will become apparent to those skilled in the art.

(1) For example, in the above embodiment, the suction pressure Ps of the capacity-variable compressor 2 is estimated based on the evaporator temperature Te used for indicating the thermal load of the refrigeration cycle, and the refrigerant flow amount Gr in the refrigeration cycle. Not being limited thereto only, however, a pressure of a predetermined part in the capacity-variable compressor 2 may be estimated based on a thermal load at a part in the refrigeration cycle and the refrigerant flow amount Gr in the refrigeration cycle.

(2) In the above embodiment, the estimated suction pressure Ps1 is estimated at the start of the acceleration cut control of the capacity-variable compressor 2 based on the evaporator temperature Te and the refrigerant flow amount Gr. Not being limited thereto only, however, the real suction pressure Ps of the capacity-variable compressor 2 may be estimated by a variety of control processings.

(3) In the above embodiment, the pressure loss ΔP between the evaporator and the compressor is estimated in compliance with the logical formula (formula F3), however, the invention is not limited. For example, a control map having a correlation between the refrigerant flow amount Gr and the pressure loss ΔP between the evaporator and the compressor may be stored in the ROM or the like in the electric control unit 100, in advance and the pressure loss ΔP between the evaporator and the compressor may be estimated based on the control map. Further, a relation between the refrigerant flow amount Gr and the pressure loss ΔP across the evaporator and the compressor may have been calculated in advance through experiment and the like.

(4) In the above embodiment, further, the preset suction pressure Pso is calculated at the start of the acceleration cut control and a control current In is output to the capacity-varying unit 15 so that the preset suction pressure Pso is attained, to which only, however, the invention is not limited. At the start of the acceleration cut control, for example, the control current In output to the capacity-varying unit 15 is forcibly set to zero and after the acceleration priority time T1 has elapsed, the preset suction pressure Pso may be calculated based on the estimated suction pressure Ps1 at the end of the acceleration cut control (when the acceleration priority time T1 has passed) and on the predetermined pressure value α, and the control current In may be output to the capacity-varying unit 15 so that the real suction pressure Ps becomes the preset suction pressure Pso. Therefore, the compressor torque load can be reliably decreased and the load exerted on the vehicle engine can be decreased in a predetermined period of time. Moreover, the preset suction pressure Pso at the end of the acceleration cut control is suppressed not to deviate from the real suction pressure Ps, making it possible to suppress a sudden decrease in the acceleration stemming from an increased load exerted on the vehicle engine and to suppress the shock stemming from a large load exerted on the compressor.

(5) Further, the control current In may be determined by the feedback control (e.g., PI control) so that the real suction pressure Ps becomes the preset suction pressure Pso in a predetermined period of time. This suppresses the deviation between the preset suction pressure Pso and the real suction pressure Ps, enabling a correct control operation to be performed.

(6) In the above embodiment, further, the refrigeration cycle device 1 of the invention is applied to the vehicle air conditioning apparatus. Not being limited thereto only, however, the refrigeration cycle device 1 of the invention can also be applied to refrigeration cycle device for vehicles such as freezing and refrigerating cars.

(7) In the above embodiment, further, the flow amount sensor 8 is arranged in the capacity-variable compressor 2 in the region of the discharge side. Not being limited thereto only, however, the flow amount sensor 8 may be arranged, for example, on the outside of the capacity-variable compressor 2. In this case, a mass flow meter can be used as a flow amount sensor 8 to enhance the degree of freedom for arranging the flow amount sensor 8, thereby enabling the capacity-variable compressor 2 to be more simply constituted.

(8) In the above embodiment, further, the preset suction pressure Pso is calculated in the acceleration cut control, however, the invention is not limited. For example, the control processing of the embodiment may be employed for high rotational speed protection control of the compressors.

(9) In the above embodiment, the preset suction pressure Pso is calculated by adding up the estimated suction pressure Ps1 and the predetermined pressure α together, however, the invention is not limited. If the preset suction pressure Pso is larger than the real suction pressure, then the compressor torque can be decreased and the load exerted on the engine 11 can be decreased. Therefore, the preset suction pressure Pso may be, for example, the evaporator pressure PL.

Such changes and modifications are to be understood as being within the scope of the present invention as defined by the appended claims.

What is claimed is:

1. A refrigeration cycle device for a vehicle, comprising:
a refrigeration cycle that includes a capacity-variable compressor driven by an engine mounted on the vehicle and having a capacity varying portion configured to vary a refrigerant discharge capacity discharged from the compressor, and an evaporator coupled to a refrigerant suction side of the compressor and for cooling air to be blown into a compartment by evaporating a low-pressure refrigerant;

means for calculating a preset suction pressure that serves as a target value of a refrigerant suction pressure of the compressor and for controlling the refrigerant discharge capacity of the compressor by operating the capacity varying portion such that the refrigerant suction pressure approaches the preset suction pressure;

a thermal load detection portion configured to detect a thermal load of the refrigeration cycle;

a refrigerant flow amount detection portion configured to detect a flow amount of refrigerant circulating through the refrigeration cycle;

means for estimating the refrigerant suction pressure of the compressor based on the thermal load detected by the thermal load detection portion and on the flow amount detected by the refrigerant flow amount detection portion, the estimating means being in communication with the calculating means;

means for detecting a load condition exerted on the engine; and means for determining whether the engine is at a high load condition based on the load condition detected by the detecting means; wherein the estimating estimation means estimates an estimated suction pressure after the determining means determines that the engine is at the high load condition; and the calculating means calculates the preset suction pressure based on the estimated suction pressure, and controls the refrigerant discharge capacity of the compressor such that the suction pressure of the compressor becomes the preset suction pressure.

2. The refrigeration cycle device according to claim 1, wherein:

the thermal load detection portion is an evaporator temperature detector configured to detect an evaporator temperature which is a physical quantity related to a refrigerant temperature in the evaporator;

the estimating means estimates an evaporator pressure which is a refrigerant pressure in the evaporator, based on the evaporator temperature detected by the evaporator temperature detector;

the estimating means estimates a pressure loss of the refrigerant between the evaporator and the compressor, based on the flow amount detected by the refrigerant flow amount detection portion; and the estimating means estimates the refrigerant suction pressure of the compressor by subtracting the pressure loss from the evaporator pressure.

3. The refrigeration cycle device according to claim 1, wherein:

the load condition includes a vehicle speed and an accelerator open degree of the vehicle; and the determining means determines that the engine is at the high load condition when the vehicle speed is lower than a predetermined speed and when the accelerator open degree is larger than a predetermined open degree.

4. The refrigeration cycle device according to claim 1, wherein the preset suction pressure is calculated by adding a predetermined pressure to the estimated suction pressure.

5. The refrigeration cycle device according to claim 4, wherein the predetermined pressure is increased or decreased in proportion to the refrigerant flow amount detected by the refrigerant flow amount detection portion.

6. The refrigeration cycle device according to claim 1, wherein the calculating means controls the capacity varying portion to give the preset suction pressure that is calculated based on the estimated suction pressure and, thereafter, gradually decreases the preset suction pressure.

7. The refrigeration cycle device according to claim 1, wherein the calculating means performs a feedback control such that the suction pressure of the compressor becomes the preset suction pressure calculated based on the estimated suction pressure.

8. The refrigeration cycle device according to claim 1, wherein the preset suction pressure is the evaporator pressure estimated based on the evaporator temperature.

9. The refrigeration cycle device according to claim 1, wherein the refrigerant flow amount detection portion is configured to detect the flow amount of refrigerant discharged from the compressor.

10. The refrigeration cycle device according to claim 1, wherein:

the refrigeration cycle further includes a refrigerant radiator located to cool the refrigerant discharged from the compressor, and an expansion unit configured to decompress the refrigerant flowing out of the refrigerant radiator; and the evaporator is coupled to the expansion unit such that the low pressure refrigerant decompressed in the expansion unit flows into the evaporator.

* * * * *